United States Patent
Nunes, Jr.

(10) Patent No.: US 6,376,954 B1
(45) Date of Patent: Apr. 23, 2002

(54) HERMETIC COMPRESSOR FOR A REFRIGERATION SYSTEM

(75) Inventor: Ernani Pautasso Nunes, Jr., Joinville-SC (BR)

(73) Assignee: Empresa Brasileira de Compressores S./A -Sembraco, Joinville -SC (BR)

(*) Notice: Subject to any disclaimer, the term of this patent is extended or adjusted under 35 U.S.C. 154(b) by 0 days.

(21) Appl. No.: 09/319,623

(22) PCT Filed: Nov. 27, 1998

(86) PCT No.: PCT/BR98/00108

§ 371 Date: Sep. 21, 1999

§ 102(e) Date: Sep. 21, 1999

(87) PCT Pub. No.: WO99/30404

PCT Pub. Date: Jun. 17, 1999

(30) Foreign Application Priority Data

Dec. 11, 1997 (BR) .............................. 9706090

(51) Int. Cl.[7] .............................. H02K 15/00
(52) U.S. Cl. .......................... 310/91; 310/261
(58) Field of Search .................... 310/261, 91, 42, 310/156; 29/596–598, 732, 447, 800

(56) References Cited

U.S. PATENT DOCUMENTS

| | | | |
|---|---|---|---|
| 2,213,724 A | * 9/1940 | Vogel .......................... | 310/156 |
| 2,488,729 A | * 11/1949 | Kooyman .................... | 310/156 |
| 3,553,512 A | * 1/1971 | Vettermann ................. | 310/156 |
| 3,737,988 A | 6/1973 | Bednarki | |
| 3,811,805 A | * 5/1974 | Moody, Jr. et al. .......... | 418/88 |
| 3,909,647 A | * 9/1975 | Peterson ..................... | 310/156 |
| 4,035,676 A | * 7/1977 | Adair .......................... | 310/42 |
| 4,206,379 A | * 6/1980 | Onda .......................... | 310/156 |
| 4,286,182 A | * 8/1981 | Lenz ........................... | 310/61 |
| 4,742,259 A | * 5/1988 | Schaefer et al. ............ | 310/156 |
| 4,855,630 A | * 8/1989 | Cole ........................... | 310/156 |
| 4,910,861 A | * 3/1990 | Dohogne ..................... | 310/156 |
| 4,998,032 A | * 3/1991 | Burgbacher ................. | 310/156 |
| 5,325,007 A | * 6/1994 | Huss et al. .................. | 310/180 |
| 5,531,537 A | 7/1996 | Pink et al. | |
| 5,723,928 A | * 3/1998 | Imai et al. ................... | 310/114 |
| 5,945,766 A | * 8/1999 | Kim et al. ................... | 310/268 |
| 5,974,656 A | * 11/1999 | Fernandez ................... | 29/596 |
| 6,098,273 A | * 8/2000 | Fernandez ................... | 29/732 |

FOREIGN PATENT DOCUMENTS

| | | | |
|---|---|---|---|
| DE | 849 942 | 11/1952 | |
| DE | 1 600 189 | 3/1970 | ............ F16D/1/08 |
| DE | 41 41 021 | 6/1993 | ............ F16D/1/08 |
| DE | 196 17 134 | 10/1997 | ............ H02K/1/28 |
| FR | 1 449 454 | 11/1966 | |
| WO | WO 98 16000 | 4/1998 | .......... H02K/15/02 |

\* cited by examiner

Primary Examiner—Tran Nguyen
(74) Attorney, Agent, or Firm—Darby & Darby

(57) ABSTRACT

A hermetic compressor for a refrigeration system, in which a previously dilated tubular bushing (10) is mounted around an axial portion of a shaft (6) and affixed to said axial portion upon contraction thereof, said tubular bushing (10) mounted to the shaft (6) then being assembled and rotatively axially affixed inside the rotor (4).

11 Claims, 3 Drawing Sheets

HERMETIC COMPRESSOR FOR A REFRIGERATION SYSTEM

FIELD OF THE INVENTION

The present invention refers to a hermetic compressor for a refrigeration system and, more specifically, to a system for assembling a shaft in an electric motor rotor, said rotor comprising a metallic core carrying magnets.

BACKGROUND OF THE INVENTION

Motors provided with a rotor carrying permanent magnets have been largely used in industrial applications and in domestic equipments. Nowadays, such motors are also used in hermetic compressors of refrigeration appliances.

The rotor carrying permanent magnets is rigidly mounted onto a portion of an eccentric shaft of a compressor, in order to resist to the transmission of torque generated by the motor to the eccentric shaft, to the efforts due to impacts produced during transportation and also to thermal variations which are inherent in the operation of the compressor (heating and cooling of the compressor). Moreover, this assembly is so effected as to avoid the occurrence of gaps between the rotor and the shaft, avoiding relative movements to appear therebetween.

In these rotors, the magnets are affixed to the rotor core by means of a technique which imparts to the rotor a mechanical structure required for the operation of the compressor. The retention of the magnets to the rotor core may be achieved by processes, such as chemical retention (adhesion) of the magnets to the rotor core and partially or completely encapsulating the magnets on the rotor core, for example with a thermoretractible or thermoinjectable film or by using a metallic cover.

One of the known techniques for affixing the rotor with permanent magnets onto the compressor shaft consists in heating the rotor, until dilatation of its internal diameter has been achieved, in order to allow the shaft to be freely introduced into said rotor.

The attachment of the shaft to the rotor, after said shaft has been introduced into said rotor, occurs during the cooling and consequent contraction of the rotor, which, by reducing the diameter of the motor hole, eliminates the assembly gap and adjusts the rotor to the shaft, guaranteeing the attrition which affixes these parts together.

A deficiency of using the technique of heating the rotor to be assembled by interference to the compressor shaft is that, in the case of magnets glued around the rotor core, it may occur degradation in the resistance properties of the adhesive used during the heating process, causing the release of said magnets immediately or during the operation of the compressor.

In the case of rotors encapsulated with the thermoretractible or thermoinjectable material, the same effect is possible. In the rotors encapsulated by a metallic cover, cracks may appear in the magnets, provoked by tensions resulting from the difference between the thermal dilatation coefficients of the materials of the magnet and metallic cover.

Another disadvantage is the need for having a high power oven or heating device for the rotor, as a function of its thermal inertia and the short time interval it remains in the assembly line.

Another known technique for assembling the rotor to the shaft uses mechanical interference between these parts and consists in inserting the shaft into the rotor when the difference between their temperatures is small or even null. In this case, the interference coupling is obtained by applying a high axial assembly load in both components (rotor and shaft).

In the assembly with no heating or with little rotor heating, the shaft is introduced with a great effort into the central hole of the rotor, which usually deforms resilient components or fragile parts of the assembly and allows burrs or fragments to be produced due to the high attrition between the rotor and the shaft. Another disadvantage is the high cost for producing the components, due to the finishing tolerances required for the compressor shaft and for the internal diameter of the rotor, as a form of limiting the assembly loads. Even establishing precise dimensions for both the rotor and shaft, a great difficulty remains in obtaining a relative axial positioning with the desired precision therebetween.

Another known technique, in which the shaft is cooled, has as disadvantage the high manufacture cost of the components, due to the finishing tolerances required for the compressor shaft and for the internal diameter of the rotor. Another disadvantage of this technique is the short time interval available for the rotor to be mounted to the shaft, before the temperature of said shaft raises up to a value in which the operation is impossible to be executed.

The attachment between the rotor with permanent magnets and the shaft may also be achieved by using adhesive or chemical retention, in which an adhesive is applied into a gap, which is previously determined between the internal diameter of the rotor and the external diameter of the compressor shaft. The retention may be also obtained by a welding process, with or without deposition of material between the shaft and the rotor.

The technique in which the shaft is chemically retained to the rotor has the inconvenience that the adhesive employed may contaminate the gap existing between the shaft and a supporting bearing thereof provided in the compressor, locking these parts together and impairing the perfect sliding therebetween and even avoiding the operation of the compressor. Another disadvantage of this technique is that the compressor shaft may be contaminated with oil, before the adhesive is applied to the surface, which causes a degradation in the properties of chemical retention.

In the case of welding, with or without deposition of material, the disadvantages consist in the little space available for the application of welding, generation of sparks, arcs and/or gases, and rotor heating, which may cause degradation of the adhesive used to retain the magnets to the core or to affix the thermoretractible or thermoinjectable cover.

DISCLOSURE OF THE INVENTION

Thus, it is an objective of the present invention to provide a hermetic compressor having a rotor with permanent magnets with a system, which allows assembling the motor shaft of the compressor into the motor rotor with permanent magnets, without submitting fragile or heat susceptible components to heat or to high efforts which may cause damages to said parts, minimizing losses and leading to an economical and industrially viable result.

A further objective of the present invention is to provide a hermetic compressor such as mentioned above, which allows the shaft to be affixed to the rotor, without requiring said shaft to be previously cooled and assuring a correct and accurate relative positioning between said parts.

A specific objective of the present invention is to provide a system and a process for assembling the shaft to the rotor, which allows said assembly to be achieved by one of the interference and gluing techniques.

These and other objectives are attained by a hermetic compressor for a refrigeration system, having an electric motor including a rotor, which is rotatively and axially affixed around an axial portion of the shaft of the electric motor, said compressor comprising a tubular bushing, which is seated onto and rotatively and axially affixed around the shaft, in order to involve at least said axial portion of the latter inside the rotor. The assembly of the shaft inside the rotor is achieved by first assembling and affixing the tubular bushing around the axial portion of the shaft and then assembling and affixing the shaft carrying the tubular bushing into a central hole provided in the rotor.

BRIEF DESCRIPTION OF THE DRAWINGS

The invention will be described below, with reference to the attached drawings, in which.

BEST MODE OF CARRYING OUT THE INVENTION

Figure 1:
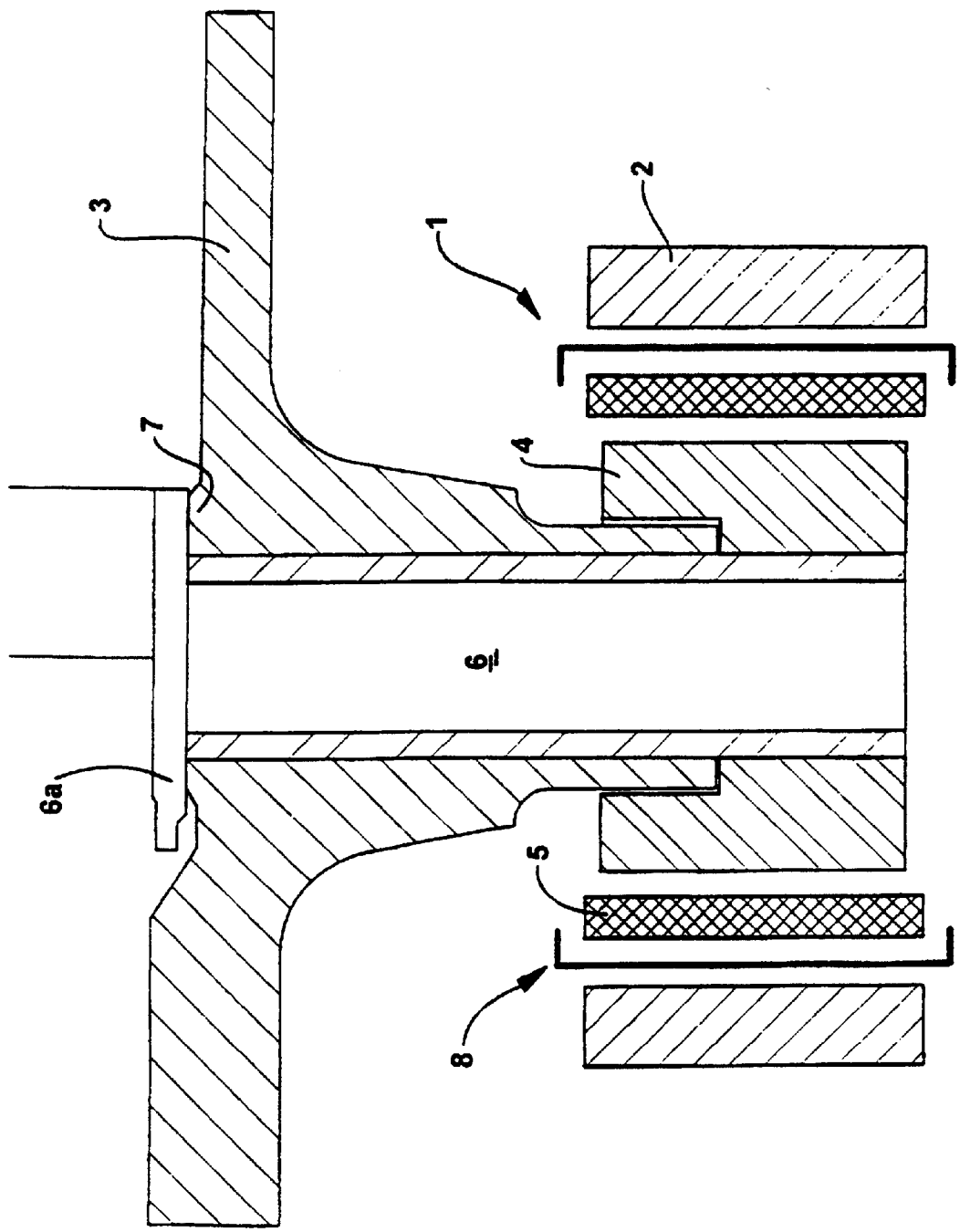
FIG. 1 illustrates, schematically and in a longitudinal sectional view, a shaft mounted to a rotor of an electric motor of the type used in small hermietic compressors.
Figure 2:
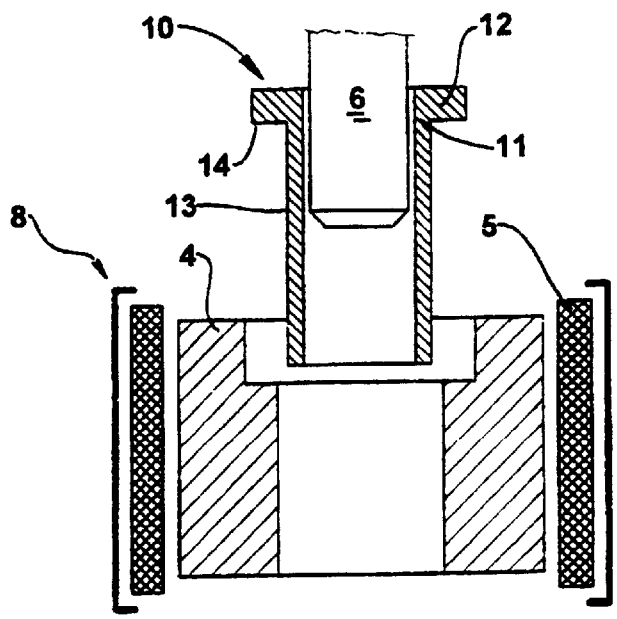
FIG. 2 illustrates, schematically and in a longitudinal sectional view, a shaft, which is provided with the tubular bushing constructed according. to a first embodiment of the present invention and which will be mounted to a rotor carrying magnets.

According to FIG. 1, the present invention will be described with respect to an electric motor 1 having a stator 2, which is affixed to a cylinder block 3 of a non-illustrated compressor, and a rotor 4 carrying magnets 5 and affixed around an axial portion of a shaft 6 supported by the cylinder block 3 and located below an axial bearing 7, which supports the shaft 6 and which is defined on an upper portion of the cylinder block 3 and whereupon is seated a flange portion 6a of said shaft 6. The rotor-magnet assembly may receive, for example, an external cover 8.

The assembly of the shaft 6 into the rotor 4 should present a correct positioning with no gaps, in order to avoid relative movements therebetween.

For the operation of the motor, an axial gap should be provided between the cylinder block 3 and the rotor 4, as well as a radial gap between the hole of the axial bearing 7 and the shaft 6, necessary to allow both the rotor 4 and shaft 6 to freely rotate in relation to the fixed parts of the motor. However, as already discussed, the assembly of the shaft to the rotor by the known interference and gluing techniques may impair the provision of said radial and axial gaps.

According to the present invention, the attachment of the shaft to the rotor occurs by means of an assembly system, which guarantees the maintenance of said radial and axial gaps between the shaft and, respectively, between the rotor and the bearing, and which comprises a tubular bushing 10, for example metallic, which has at least part of the extension thereof surrounding a determined axial lower portion of the shaft 6 for attaching the latter to the rotor 4, and which is rotatively and axially affixed to said axial portion of the shaft 6 and to the rotor 4, without an axial gap.

The tubular bushing 10 is dimensioned so that, after being mounted to the shaft 6, it defines a diameter to the shaft 6/tubular bushing 10 assembly, at minimum substantially equal to that of a central hole provided in the rotor 4, in order to allow the shaft/rotor assembly to be effected at room temperature by one of the interference and/or gluing processes, for example. The tubular bushing 10 is dimensioned in order to have, after mounting the shaft 6 to the rotor 4, for example an axial extension superior to that of the rotor 4.

According to an illustrated embodiment of the present invention, the tubular bushing 10 has, from an upper end 11, an annular flange 12, which acts as a positioning and limiting element for the introduction of the bushing into the rotor 4, and which also acts as a support for inserting the shaft 6 into the rotor 4. In the case the bushing is glued to the rotor, the radial flange 12 further acts as an axial retaining means for the gluing means, preventing the latter from reaching the bearing, as it occurs in the prior art.

After mounting the tubular bushing 10 to the shaft 6, the assembly is mounted inside the central hole of the rotor 4, for example by interference at room temperature and according to a desired pre-established shaft/rotor positioning, which is assured by seating the annular flange onto a supporting upper face defined in the rotor 4.

Besides the possibility of the tubular bushing 10 mounted to the shaft 6 being axially and rotatively affixed to the rotor 4 by interference or gluing, the retention may be also achieved by using locking means provided between said tubular bushing 10 and rotor 4, in order to lock them against relative axial and rotary movements, said locking means projecting, for example, from at least one of said parts and acting in respective grooves 20 provided in the other of said parts.

Figure 3:
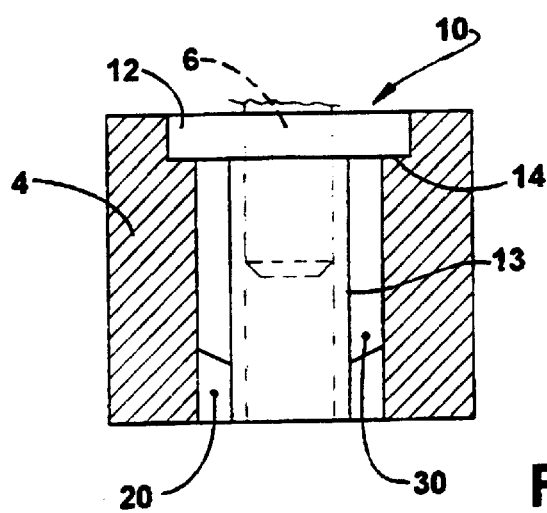
FIG. 3 illustrates, schematically and in a longitudinal sectional view, the shaft mounted to the rotor and carrying a tubular bushing constructed according to a second embodiment of the present invention.
Figure 4:
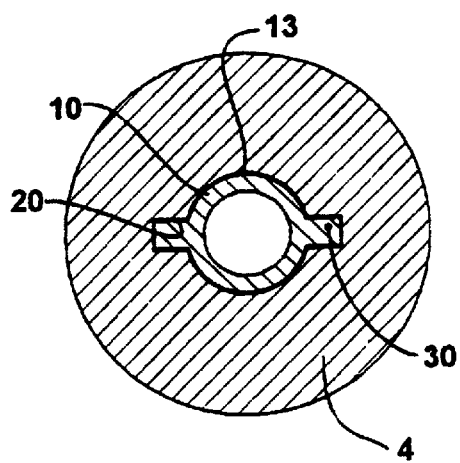
FIG. 4 illustrates, schematically and in a transversal sectional view, the shaft mounted to the rotor and carrying the tubular bushing illustrated in FIG. 3.

According to an embodiment of the present invention, illustrated in FIGS. 3 and 4, the locking means comprise ribs 30, each projecting from the lateral surface 13 of the tubular bushing 10, diametrically opposite to each other and occupying a determined axial extension of said lateral surface and actuating in a respective groove 20 provided from the internal lateral surface of the rotor 4. In this embodiment, each axial rib extends from a lower face 14 of the annular flange 12 of the tubular bushing 10.

Though not illustrated, each of said ribs 30 may be provided as a lower projection from the lower face 14 of the annular flange 12 and acting in a groove 20 in the form of a recess provided in the upper face of the rotor 4.

Figure 5:
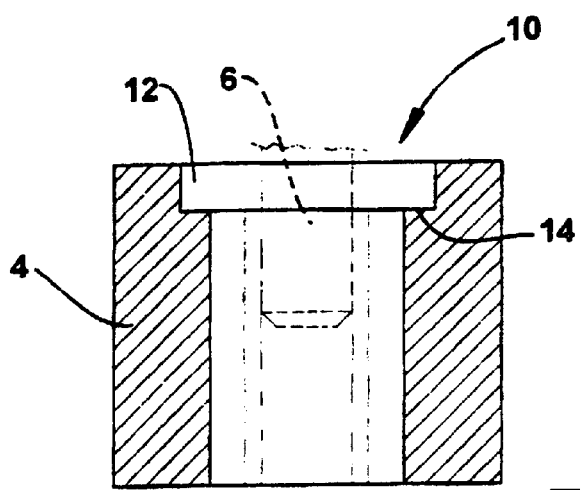
FIG. 5 illustrates, schematically and in a longitudinal sectional view, the shaft mounted to the rotor and carrying a tubular bushing constructed according to a third embodiment of the present invention.
Figure 6:
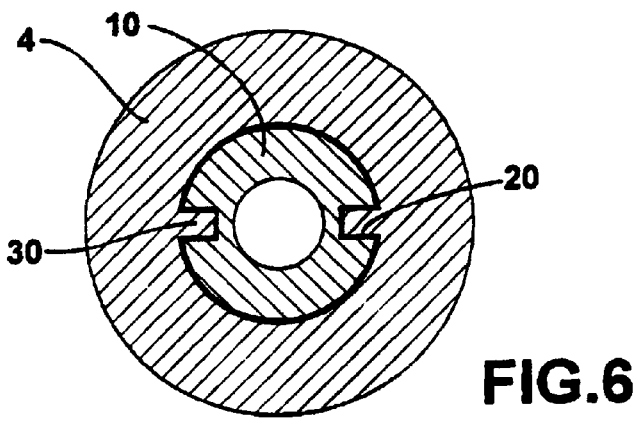
FIG. 6 illustrates, schematically and in a transversal sectional view, the shaft mounted to the rotor and carrying the tubular bushing illustrated in FIG. 5.

In another embodiment of the present invention, as illustrated in FIGS. 5 and 6, each rib 30 projects from the internal lateral surface of the rotor 4 and acts in a corresponding groove 20 provided on the lateral surface of the tubular bushing 10.

Figure 7:
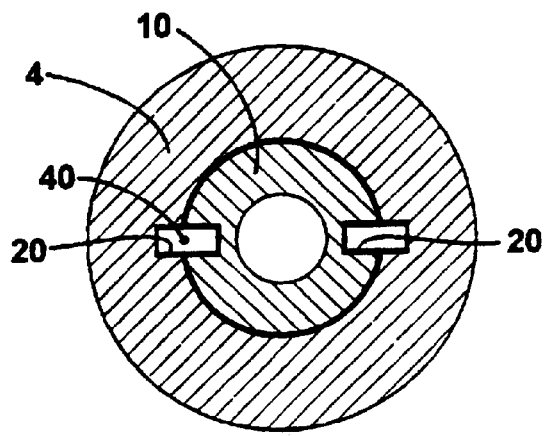
FIG. 7 illustrates, schematically and in a transversal sectional view, the shaft mounted to the rotor and carrying a tubular bushing constructed according to a fourth embodiment of the present invention.

In another embodiment as illustrated in FIG. 7, the locking means are in the form of rods 40, each having end portions, which are each fitted in a respective groove 20, each provided in one of the parts defined by the tubular bushing 10 and rotor 4.

The solution of the present invention has the advantages of enabling the shaft to be assembled to the rotor without submitting said shaft to cooling or the rotor to heating. Moreover, the use of a preheated heated tubular bushing 10 to be positioned around the shaft 6 allows said tubular bushing 10 to be tightly affixed around the shaft, which may dispense with the operation of gluing the tubular bushing to the shaft. Besides, in the case the retention is effected by gluing, the provision of the tubular bushing 10 with an annular flange eliminates the contact of the adhesive with the oil existing in the compressor shaft, when the latter is assembled to the rotor, maintaining the properties of adhesive resistance.

What is claimed is:

1. An electric motor comprising:

a stator and a toroidal rotor having a recess on one of its ends to rotate within said stator;

a shaft within said rotor to rotate therewith; and a bushing having a tubular part fitting around an axial portion of said shaft and affixed thereto, said bushing having an upper end with a peripheral annular flange whose lower face fits in said rotor recess and is rested on said rotor, and said bushing is affixed to said rotor so that upon rotation of said rotor said bushing and shaft also rotate.

2. A motor, as in claim 1, wherein said bushing tubular part has an internal diameter slightly smaller than the external diameter of said axial portion of said shaft as said bushing tubular part is affixed to said shaft.

3. A motor, as in claim 2, wherein said bushing tubular part is axially affixed around said shaft axial portion by thermo-contraction.

4. A motor, as in claim 1, further comprising locking means provided between said bushing flange and said rotor to lock said bushing and said rotor against relative movement.

5. A motor, as in claim 4, wherein said locking means project from at least one of said bushing flange and said rotor to act in respective grooves provided in the other of said bushing flange and said rotor.

6. A motor, as in claim 5, wherein said locking means are incorporated to one of said bushing flange and said rotor.

7. A motor, as in claim 5, wherein said locking means comprises a plurality of rods, each having its end portions fitted into a pair of grooves in one of said bushing flange and said rotor.

8. A motor, as in claim 1, further comprising locking means axially projecting from at least one of the lower face of said bushing annular flange and a lateral surface of said rotor.

9. A motor, as in claim 1, wherein said bushing mounted to said shaft is also glued to said rotor.

10. A motor, as in claim 1, wherein said bushing mounted to said shaft is also affixed to said rotor by a mechanical interference fit.

11. A motor, as in claim 1, wherein said flange fits entirely in said recess.

* * * * *

UNITED STATES PATENT AND TRADEMARK OFFICE
CERTIFICATE OF CORRECTION

PATENT NO.     : 6,376,954 B1
DATED          : April 23, 2002
INVENTOR(S)    : Ernani P. Nunes, Jr.

It is certified that error appears in the above-identified patent and that said Letters Patent is hereby corrected as shown below:

<u>Title page,</u>
Item [73], Assignee, "Sembraco, Joinville" should be -- Embraco, Joinville --

Signed and Sealed this

Tenth Day of June, 2003

JAMES E. ROGAN
*Director of the United States Patent and Trademark Office*